Jan. 31, 1950  G. F. FERMIER  2,496,154
PACKOFF
Filed Feb. 14, 1947

GEORGE F. FERMIER
*INVENTOR.*
BY
ATTORNEYS

Patented Jan. 31, 1950

2,496,154

UNITED STATES PATENT OFFICE 2,496,154

PACKOFF

George F. Fermier, Houston, Tex., assignor to Cameron Iron Works, Houston, Tex., a corporation of Texas Application February 14, 1947, Serial No. 728,631

8 Claims. (Cl. 285—22)

This invention relates to a seal assembly adapted for providing a sealed engagement with a member passing through it and has for its general object the provision of such a member which will be simple, efficient and inexpensive as compared with other structures designed for the same general purpose.

More specifically, it is an object of this invention to provide a seal assembly which is particularly adapted to forming a sealed engagement about the exterior of a casing or other pipe such as used in wells.

Another object is to provide such a structure in which the minimum number of parts will be necessary and in which the simplicity of construction will make for greater efficiency and lower cost of production as compared with prior structures.

A still further object is to provide a structure of the type referred to with which it will be possible to provide a seal under pressure with the simplest form of packing and to provide a means for testing the seal so formed.

Other objects and advantages of this invention will become apparent from the following description taken in connection with the accompanying drawing, wherein is set forth, by way of illustration and example, one embodiment of this invention.

Figure 1:
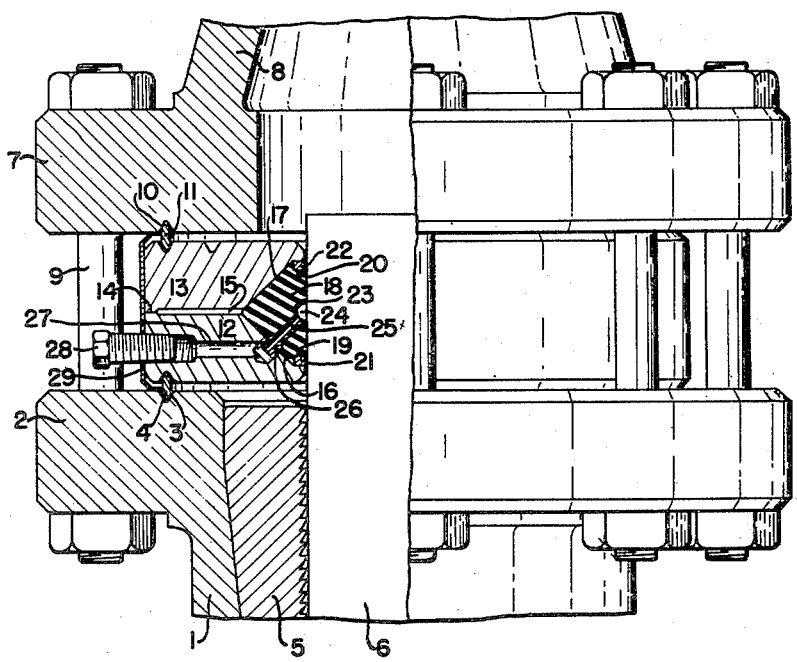
Fig. 1 is an illustration partly in vertical cross section and partly in side elevation of a seal assembly constructed in accordance with this invention being used as a means for providing a seal between a casing and casing head of a well structure.

The assembly is illustrated as mounted on the upper end of casing head 1 having a lateral flange 2 at its upper end, this flange being provided with the usual sealing ring groove 3 in its upper face, which groove is for the purpose of receiving the metallic or other similar sealing ring 4.

Suspended by means of slips 5 within the casing head 1 is illustrated the casing 6. The seal assembly which will presently be described more in detail is disposed about the upper end of the casing 6 between the flange 2 of the casing head and the lower flange 7 of a tubing head or the like 8. The flanges 2 and 7 may be drawn together in any conventional manner as by the studs 9. The flange 7 has in its lower face a sealing ring groove 10 for the reception of a metallic or similar sealing ring 11.

The seal assembly includes a body which is made up of two body parts 12 and 13, respectively, which are of relatively hard, rigid material. These parts are provided with mating ridges on their adjacent surfaces along their outer edges as shown at 14, so that these ridges will serve as limit stops to limit the movement of the outer edges of these parts toward each other and provide at all times a space between the parts inwardly of these ridges as shown at 15.

The parts 12 and 13 are also provided on their remote surfaces with sealing ring grooves adapted to receive the sealing rings 4 and 11 above mentioned, these grooves being located radially slightly inwardly from the ridges 14 on the parts 12 and 13.

The inner adjacent edges of the parts 12 and 13 are cut away or beveled as shown at 16 and 17, respectively, so that when these parts are brought together these cut away or beveled portions will, taken together, form an inwardly facing groove for the reception of the packing portion of the assembly.

Located in this groove just referred to is a packing which comprises a single ring 18 of material flowable under pressure. The inner surface of this ring is illustrated as being cylindrical for the purpose of embracing the casing 6 with a sealing pressure. It is provided with countersinks 19 and 20 adjacent its opposite ends respectively, for the purpose of receiving rings 21 and 22 which are collapsible toward the casing but are of relatively hard, rigid material, these rings being intended to collapse toward the casing as pressure on the packing is increased and to engage the casing so as to oppose any extrusion of the relatively soft packing material into the space between the casing and the body of the assembly.

Intermediate the ends of the packing it is provided with a ring 23 of relatively rigid material serving as a support and liner for a groove 24 which extends entirely about the inner face of the ring intermediate its ends. Extending away from this groove to one outer surface of the ring is a passageway 25 provided by a tubular liner 26 so as to place the groove 24 into communication with an exterior surface of the packing ring. Communicating with the outer end of this tubular member 26 is a passageway 27 in the body part 12 which passageway extends to the exterior surface of said body part and may, if desired, be closed by a suitable plug 28.

In operation, the casing head will be mounted in the customary manner as upon the upper end of a surface casing, not shown, and the casing 6 will be suspended therein by means of the slips 5. After the seal ring 4 has been put in place the seal assembly above described will be placed over the upper end of the casing and the casing cut off at a level just above the upper end of the assembly. Thereupon the upper sealing ring 11 and the tubing head or the like 8 will be put in place, and the flanges 2 and 7 will be drawn together by means of the studs 9. As these flanges are drawn together the body parts 12 and 13 will likewise be moved toward each other placing pressure upon the packing ring 18 and causing it to flow radially inwardly into sealing engagement with the casing 6. Though these parts 12 and 13 are relatively hard and rigid as compared to the packing they preferably possess a certain degree of resilience such that when movement of the outer edges of the body parts toward each other is limited by engagement of the ridges 14, the inner cut away portions of these body parts will continue to bear resiliently against the packing and will even follow it in the case of shrinkage or other action which would tend to result in loss of packing pressure.

The seal provided by the packing may then be tested by removing the plug 28 and injecting fluid under test pressure through the passageway 27 and the tubular member 26 into the groove 24. Naturally the fluid under pressure will tend to pass from the groove 24 both upwardly and downwardly along the casing and if the seal is a perfect one such leakage will be prevented, but if leakage of the pressure fluid occurs the loss of such fluid can be immediately noted and steps taken to prevent the leakage such as for example additional tightening of the studs 9.

Figure 2:
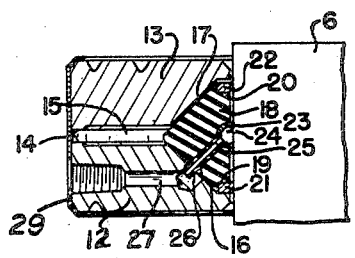
Fig. 2 is a view partly in vertical cross section illustrating the same seal assembly as it appears when uncompressed or not in use.

By reference to Fig. 2, it will be seen that the assembly prior to being compressed will be retained in assembled condition by means of a hoop or the like 29 which is formed to extend about and embrace the outer marginal portions of the body parts 12 and 13. It will further be seen that the packing ring is of such dimensions that when undistorted it has substantially the same internal diameter as the openings through the body parts and has also such dimensions that it will normally hold these body parts in positions substantially spaced from each other.

It will be seen that the structure just described is very simple in that the packing consists of but a single ring of packing material such that it may readily be caused to flow into sealing engagement with the casing and it will further be seen that means have been provided whereby the single sealing ring will actually provide two spaced seals, the same being spaced apart by the groove 24 that is in turn provided by the support ring 23. The provision of two spaced seals makes it possible to inject a test pressure between them and thus provide for the testing of the seal.

All of the objects and advantages sought by this invention may thus be accomplished by the structure provided.

Having described my invention, I claim:

1. A seal assembly having an opening therethrough and adapted to provide a sealed engagement about a member passing through said opening, said assembly comprising a pair of opposed relatively hard and rigid parts having registering openings therethrough to receive such member, said parts having their adjacent edges surrounding said openings cut away, whereby the adjacent cut away edges of said parts together form a groove facing toward and surrounding said opening, a packing comprising a single ring of relatively soft material flowable under pressure disposed in and conforming to said groove and, prior to distortion, having an opening substantially registering with the openings in said parts and dimensions such as to space said parts from each other, a support in the form of a ring of relatively hard, stiff material having a radially inwardly opening groove throughout its inner periphery embedded in said packing ring to provide an inwardly opening groove dividing the inner surface of said packing ring intermediate its ends, and said packing ring and one of said body parts having communicating passageways therein providing communication between said groove and the exterior of the assembly.

2. An assembly as set forth in claim 1, and a tubular liner of relatively stiff, hard material lining the passageway through said packing ring to prevent the closing thereof when said packing ring is placed under pressure.

3. A seal assembly having an opening therethrough and adapted to provide a sealed engagement about a member passing through said opening, said assembly comprising a relatively hard and rigid body having an opening therethrough to receive such member and having a groove therein facing toward and surrounding said opening, a packing comprising a single ring of relatively soft material flowable under pressure disposed in and conforming to said groove and, prior to distortion, having an opening substantially registering with the opening in said body, means for placing said ring under compression to cause the material thereof to flow inwardly from said groove toward said opening and form a seal about a member disposed in said opening, and means for applying a testing fluid under pressure to a zone along the inner face of said packing ring intermediate the ends thereof while said packing ring is under sealing pressure.

4. An assembly as set forth in claim 3 wherein the means for applying test pressure comprises a ring of relatively hard and rigid material as compared with said packing material, said ring having a radially inwardly opening groove therein and being embedded in the inner face of said packing ring, a tubular member extending from the groove in said ring through said packing to a point intermediate the extremities of one of the cut away portions of said body parts, and said body part having a passageway therein from said tubular member to the exterior of said body part.

5. A packing for a seal assembly, said packing comprising a single ring of a material flowable under pressure, the inner surface of said ring having an inwardly facing test groove, and a passage from said test groove in a direction generally radially outwardly through said ring to the outer surface thereof.

6. A packing as set forth in claim 5 in combination with a relatively hard and rigid liner for said groove to prevent the distortion of said packing from closing said groove when said packing is under pressure.

7. A packing as set forth in claim 5 in combination with a relatively hard and rigid liner for said groove and for the passageway through said packing to prevent the distortion of said packing from closing said groove and passageway when said packing is under pressure.

8. A composite packing assembly for use in a seal assembly, said composite packing assembly comprising annular rings of different materials, one of which is more readily flowable under pressure than the other, the more readily flowable material having two spaced inwardly facing zones adapted to provide sealing surfaces, and the ring of less flowable material being located between said zones and having a cross-section concave toward the axis of the ring, to provide a protected annular recess in the inner surface of said packing assembly between the said two sealing surfaces, and means extending through said packing assembly for supplying fluid under pressure from the exterior of said packing assembly into said annular recess.

GEORGE F. FERMIER.

REFERENCES CITED

The following references are of record in the file of this patent:

UNITED STATES PATENTS

| Number | Name | Date |
|---|---|---|
| 943,835 | Maltby | Dec. 21, 1909 |
| 2,357,411 | Leman | Sept. 5, 1944 |